Nov. 13, 1962

A. D. GLICK 3,064,248

DIGITAL-TO-PULSE TRAIN CONVERTER

Filed April 26, 1957

4 Sheets-Sheet 1

INVENTOR.
ARTHUR D. GLICK

BY George W. Field

ATTORNEY

Nov. 13, 1962 A. D. GLICK 3,064,248

DIGITAL-TO-PULSE TRAIN CONVERTER

Filed April 26, 1957

4 Sheets-Sheet 2

INVENTOR.
ARTHUR D. GLICK
BY [signature]
ATTORNEY

Nov. 13, 1962

A. D. GLICK 3,064,248

DIGITAL-TO-PULSE TRAIN CONVERTER

Filed April 26, 1957

4 Sheets-Sheet 3

INVENTOR.
ARTHUR D. GLICK

BY George W. Field

ATTORNEY

Nov. 13, 1962 A. D. GLICK 3,064,248

DIGITAL-TO-PULSE TRAIN CONVERTER

Filed April 26, 1957

4 Sheets-Sheet 4

INVENTOR.
ARTHUR D. GLICK

BY [signature]

ATTORNEY

United States Patent Office 3,064,248

Patented Nov. 13, 1962

3,064,248

DIGITAL-TO-PULSE TRAIN CONVERTER

Arthur D. Glick, St. Paul, Minn., assignor to Minneapolis-Honeywell Regulator Company, Minneapolis, Minn., a corporation of Delaware Filed Apr. 26, 1957, Ser. No. 655,243

5 Claims. (Cl. 340—347)

This invention relates to pulse apparatus and more particularly relates to an electric converter in which a parallel binary number input is converted to a pulse output, the average amplitude of which is proportional to the value of the binary number input.

In electric equipment, for example, computers, in which numbers of quantities are represented by a group of binary digits it is sometimes desirable to express certain quantities in a manner more readily usable by other equipment. A voltage or current of an amplitude analogous to the value of the binary number is, in some cases, conveniently used. In order to obtain such an analogous quantity, however, special equipment is required. If little accuracy is required in the transformation or conversion of the binary number to an analogous quantity few difficulties may be encountered; however, where high accuracy and speed are required, equipment capable of precise operation is needed to perform the conversion. Many methods have been devised to accomplish binary to analog conversion, and each, of course, suffers from its particular limitations. In those methods using weighted voltages or currents, or using weighted precision resistors, the problems are apparent; precision power supplies are both expensive and bulky, and precision resistors in addition to being expensive are frequently disposed to change their characteristics as time goes on. Some other methods, using pulse techniques, require highly stable and precise pulse sources. My invention avoids such difficulties, and still provides for great precision.

Briefly, the operation of the converter is as follows. Pulses from a clock pulse source are applied to the input of a flip-flop cascade, the cascade operating as a pulse divider. Each flip-flop produces output pulses evenly distributed and of one-half the repetition rate of the previous flip-flop in the cascade. The flip-flops in the cascade are so interconnected that none of the output pulses from any of the flip-flops coincide. The output pulses are applied to controlled gates, one gate per flip-flop, and each gate is controlled by a digit of the binary number to be converted. The outputs from all of the gates are combined, and the number of pulses appearing in this combined output during a given time interval corresponds to the binary number input. The lowest order binary digit, of course, controls the gate connected to the flip-flop having the lowest frequency output, the next higher order binary digit controls the gate connected to the previous flip-flop in the cascade, and so on. The combined output is applied to precision pulse apparatus, which produces a pulse output wherein each pulse has a duration equal to the time between two clock pulses. Since the height of these pulses may also be controlled accurately, the output from the entire converter is caused to have an average magnitude proportional to the value of the binary number input.

It is an object of this invention to provide new and useful electric apparatus for converting a binary number input to an analogous quantity.

Another object of this invention is to provide means for converting the binary number input to an electric pulse output having an average repetition rate proportional to the value of the binary number.

A further object of this invention is to provide electric means for converting a binary number input to a pulse output having precisely timed and spaced pulses, the average amplitude of which is proportional to the binary number input.

A still further object of this invention is to provide electric means whereby a precisely timed pulse is produced in response to each input pulse.

These and other objects of the present invention will be understood upon consideration of the accompanying specification, claims, and drawings, of which:

To understand the operation of the converter it should be noted that the binary number system referred to in this specification is that in which a number is represented by a group of digits that take the form 0 and 1 and in which group the digits from right to left are the coefficients of a successively higher orders of two. For example, the binary number 1101 represents $1\times2^3+1\times2^2+0\times2^1+1\times2^0$, which equals 8+4+0+1 or 13 in decimal form. Generally: $N=d_n2^n+\ldots d_32^3+d_22^2+d_12^1+d_02^0$ where N is the number, the $d$'s are the binary digits for the orders denoted by the subscripts, and the order of a digit refers to the power to which the radix, 2, is raised in the term containing that digit.

Figure 1:
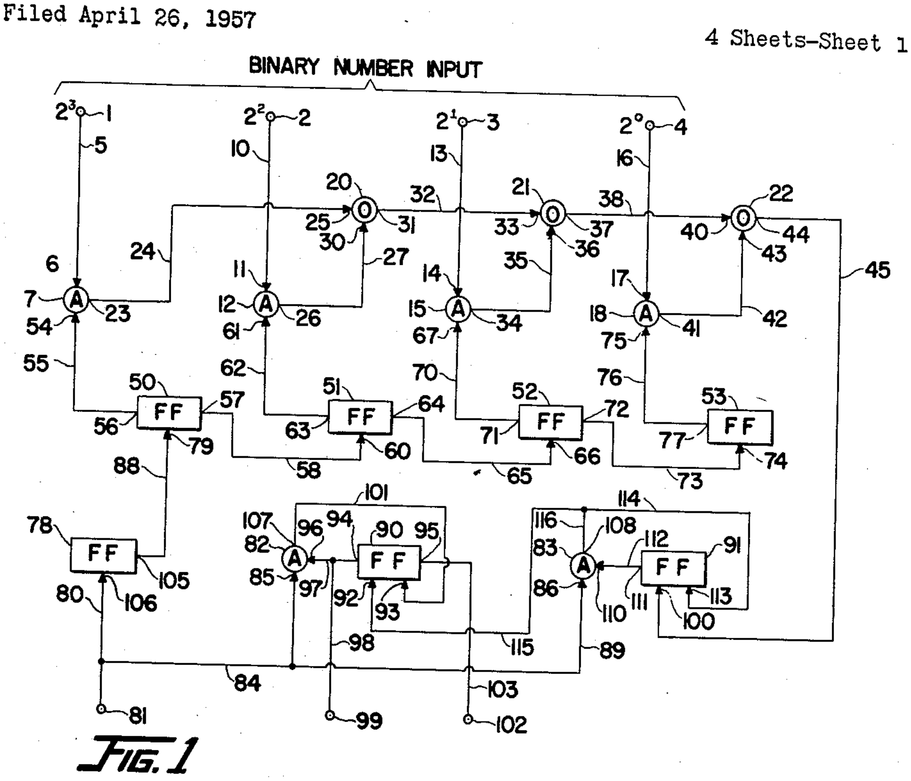
FIGURE 1 is a schematic representation of a four digit binary number converter embodying the invention.

With reference now to FIGURE 1, there are shown terminals 1, 2, 3, and 4, to which signals representing the digits in a binary number input may be applied. Terminal 1 is connected to an input 6 of "and" gate 7 through conductor 5. Terminal 2 is connected to input 11 of "and" gate 12 through conductor 10; terminal 3 is connected to input 14 of "and" gate 15 by conductor 13, and terminal 4 is connected to input 17 of "and" gate 18 through conductor 16. The output 23 of "and" gate 7 and the output 26 of "and" gate 12 are connected by conductors 24 and 27 respectively to inputs 25 and 30 of "or" gate 20. The output 31 of "or" gate 20 and the output 34 of "and" gate 15 are connected through conductors 32 and 35, respectively, to inputs 33 and 36 of "or" gate 21; and the output 37 of "or" gate 21 and the output 41 of "and" gate 18 are connected through conductors 38 and 42, respectively, to inputs 40 and 43 of "or" gate 22. Also shown are flip-flops 50, 51, 52, and 53. One output 56 of flip-flop 50 is connected by conductor 55 to input 54 of "and" gate 7, and another output 57 of flip-flop 50 is connected by conductor 58 to the input 60 of flip-flop 51. Conductor 62 connects output 63 of flip-flop 51 to input 61 of "and" gate 12 and conductor 65 connects output 64 of flip-flop 51 to input 66 of flip-flop 52. Output 71 of flip-flop 52 is connected to input 67 of "and" gate 15 by conductor 70, and output 72 of flip-flop 52 is connected to input 74 of flip-flop 53 by conductor 73. Input 75 of "and" gate 18 is connected to output 77 of flip-flop 53 by conductor 76.

Also shown is flip-flop 78, of which input 106 is connected by conductor 80 to terminal 81, at which is applied a clock pulse input, and output 105 of flip-flop 78 is connected to input 79 of flip-flop 50 by conductor 88.

In addition there are shown two "and" gates 82 and 83, and two flip-flops 90 and 91, which are interconnected as follows. Terminal 81 is connected through conductor 84 to input 85 of "and" gate 82, and is connected through conductors 84 and 89 to input 86 of "and" gate 83. Another input 96 of "and" gate 82 is connected by conductor 97 to output 94 of flip-flop 90. Output 94 of flip-flop 90 is also connected to output terminal 99 by conductor 98, and output 95 of flip-flop 90 is connected to a further output terminal 102 through conductor 103. Output 107 of "and" gate 82 is connected through conductor 101 to input 93 of flip-flop 90. Input 110 of "and" gate 83 is connected to output 111 of flip-flop 91 by conductor 112, and output 108 of "and" gate 83 is connected by conductors 116 and 114 to input 113 of flip-flop 91 and is also connected through conductors 116 and 115 to input 92 of flip-flop 90. Flip-flop 91 has a further input 100, which is connected by conductor 45 to the output 44 of "or" gate 22. It will be noted that terminals 1, 2, 3, and 4 are also labeled with powers of two; terminal 4 is labeled $2^0$, terminal 3 is labeled $2^1$, terminal two is labeled $2^2$, and terminal 1 is labeled $2^3$. The powers of two here shown are meant to designate the orders of the digits represented by the signals applied thereto.

Figure 2:
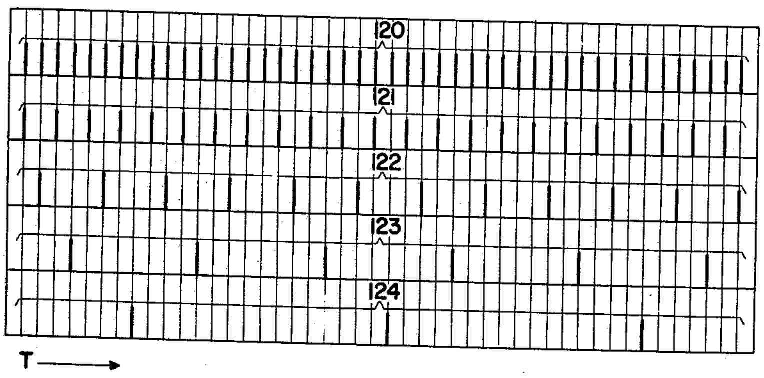
FIGURE 2 is a pictorial representation of some of the wave forms appearing in the diagram of FIGURE 1.

FIGURE 2 shows in pictorial form idealized wave forms appearing in the diagram of FIGURE 1. The pulses designated 120 represent the input signals at input 79 of flip-flop 50. The pulses labeled 121 represent the signals at output 56 of flip-flop 50, pulses 122 represent the signals at output 63 of flip-flop 51, pulses 123 represent the signal at output 71 of flip-flop 52, and pulses 124 depict the signals at output 77 of flip-flop 53. All of the signals shown in FIGURE 2 are represented on the same time base.

Figure 3:
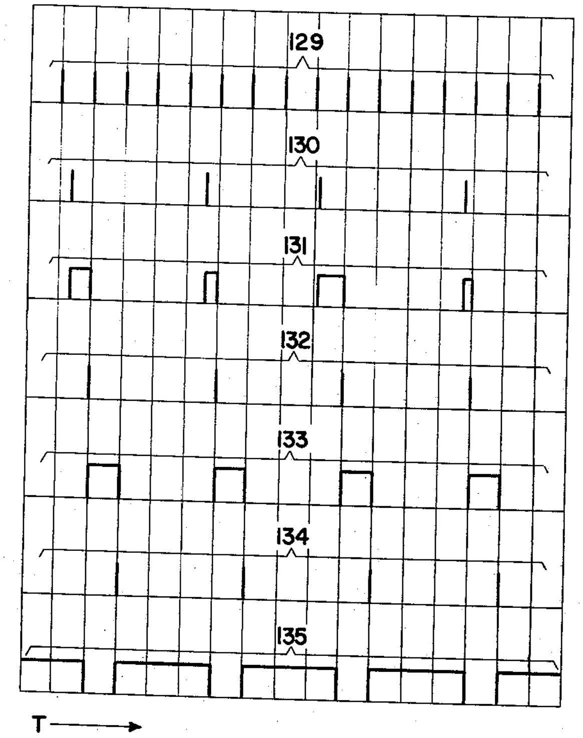
FIGURE 3 is a pictorial representation of some of the wave forms appearing in the diagram of FIGURE 1.

FIGURE 3 depicts another group of signals appearing at several points in the diagram of FIGURE 1, and is used to explain and clarify the operation of that portion of the device shown in FIGURE 1 that produces precision output pulses. Pulses 129 represent the clock pulse input appearing at terminal 81, and pulses 130 represent the pulses appearing on conductor 45; these pulses have varying amounts of delay with respect to the original clock pulse input at terminal 81. Signals 131 represent the output 111 of flip-flop 91, and pulses 132 represent the signals at output 108 of "and" gate 83. Rectangular pulses 133 represent the precision output of flip-flop 90 appearing at output 94, and rectangular signals 135 represent the inverse precision output appearing at output 95 of flip-flop 90. The pulses 134 depict the signals at output 107 of "and" gate 82.

Figure 4:
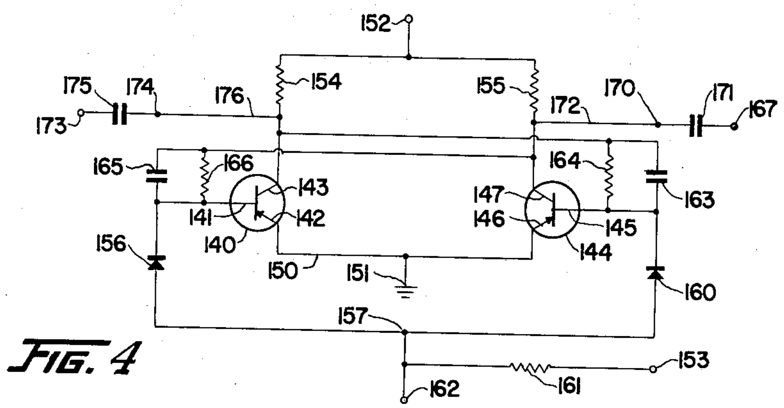
FIGURE 4 is a schematic representation of a bistable multivibrator of the toggle type having a single pulse input and having pulse outputs.

FIGURE 4, showing a circuit for a bistable multivibrator of flip-flop, is connected as follows. A transistor 140 has a base electrode 141, an emitter electrode 142, and a collector electrode 143. Another transistor 144 has a base electrode 145, an emitter electrode 146, and a collector electrode 147. A conductor 150 interconnects emitter 142 and emitter 146 and is itself connected to a ground 151. There are shown two power terminals 152 and 153. A resistor 154 is connected between collector 143 and terminal 152; another resistor 155 is connected between collector 147 and terminal 152. A diode 156 is connected between base 141 and a junction point 157, and another diode 160 is connected between base 145 and junction point 157. Power terminal 153 is connected through resistor 161 to junction point; node 157, which is also connected directly to a pulse input terminal 162. In addition, FIGURE 4 shows the parallel combination of a capacitor 163 and a resistor 164 connected between base 145 and collector 143. The diagram also shows the parallel combination of a capacitor 165 and a resistor 166 connected between base 141 and collector 147. A pulse output terminal 167 is connected to a D.C. output terminal 170 by a capacitor 171. D.C. output terminal 170 is connected to collector 147 through conductor 172. Another pulse output terminal 173 is connected to a D.C. output terminal 174 through a capacitor 175, and D.C. output terminal 174 is connected to collector 143 through conductor 176.

Figure 5:
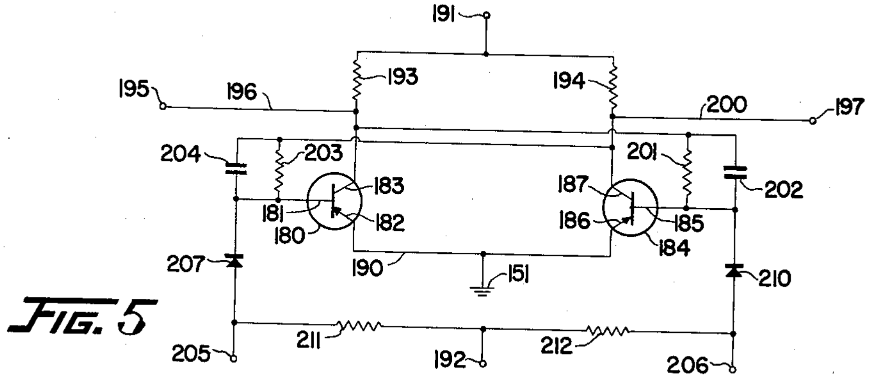
FIGURE 5 is a schematic representation of a bistable multivibrator having two inputs and voltage level outputs.

Shown in FIGURE 5 is a circuit of a bistable multivibrator or flip-flop having two inputs and having D.C. outputs. There is shown a transistor 180 having a base electrode 181, an emitter electrode 182, and a collector electrode 183. Also shown is another transistor 184 having a base electrode 185, an emitter electrode 186, and a collector electrode 187. A conductor 190 interconnects emitter 182 with emitter 186 and is itself connected to ground 151. Two power terminals 191 and 192 are shown. Interconnecting collector 183 and terminal 191 is resistor 193, and interconnecting collector 187 and terminal 191 is resistor 194. A D.C. output terminal 195 is connected to collector 183 through conductor 196, and another D.C. output terminal 197 is connected to collector 187 through conductor 200. In addition, collector 183 is connected to base 185 by the parallel combination of a resistor 201 and a capacitor 202, while collector 187 is connected to base 181 by the parallel combination of a resistor 203 and a capacitor 204. Pulse input terminals 205 and 206 are connected to base 181 and base 185, respectively, through diodes 207 and 210. Terminal 205 is also connected to power terminal 192 through a resistor 211, and pulse input terminal 206 is connected to power terminal 192 through a resistor 212.

Figure 6:
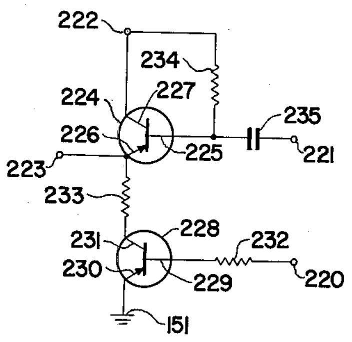
FIGURE 6 is a schematic diagram of an "and" gate used in an embodiment of the invention.

FIGURE 6 shows the circuit of an "and" gate. It has an enable input terminal 220, a pulse input terminal 221, a power input terminal 222, and a gated pulse output 223. Shown is a transistor 224, having a base electrode 225, an emitter electrode 226, and a collector electrode 227. Also shown is another transistor 228 having a base electrode 229, an emitter electrode 230 and a collector electrode 231. Emitter 230 is connected directly to ground 151. Base 229 is connected to enable terminal 220 through resistor 232, and collector 231 is connected through resistor 233 to emitter 226. Emitter 226 is also directly connected to gated output 223. Power input terminal 222 is directly connected to collector 227 and is also connected through resistor 234 to base 225. Base 225, in addition, is connected to pulse input terminal 221 through capacitor 235.

Figure 7:
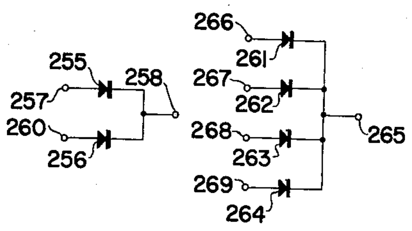
FIGURE 7 shows representations of "or" gates which may be used in an embodiment of the invention.

FIGURE 7 shows circuits of "or" gates that may be used in an embodiment of the invention. The two-input "or" circuit shown has diodes 255 and 256. Diode 255 is directly connected between input terminal 257 and output terminal 258, and diode 256 is directly connected between input terminal 260 and output terminal 258. Also shown is a four-input "or" circuit having diodes 261, 262, 263, and 264. Output terminal 265 is connected directly to similar sides of each of the diodes. The input terminals 266, 267, 268 and 269 are directly connected to the other sides of diodes 261, 262, 263, and 264 respectively.

Figure 8:
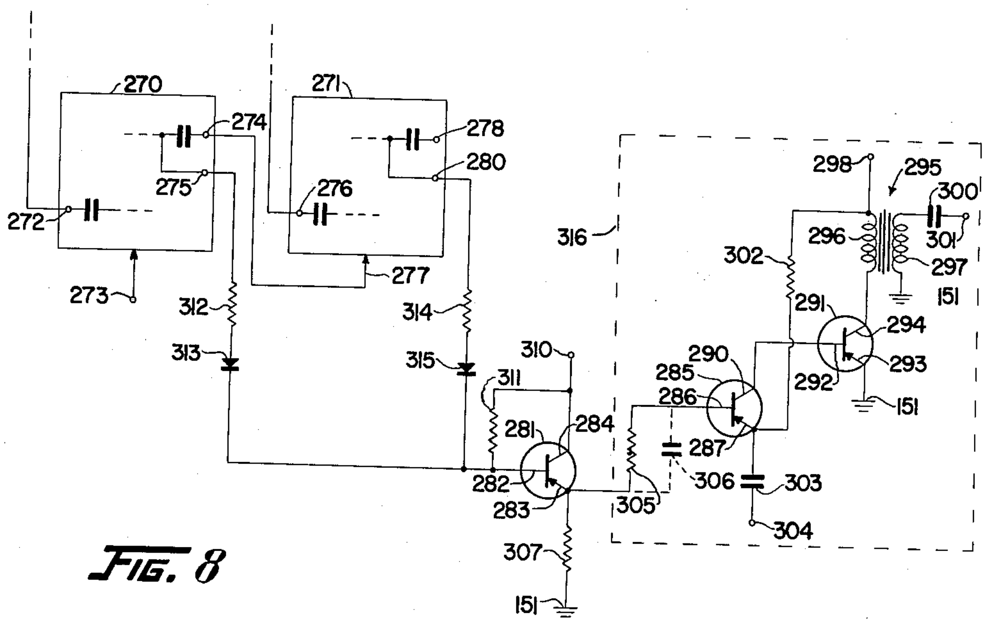
FIGURE 8 is a diagram showing a modification of a portion of the circuit of FIGURE 1.

In FIGURE 8 is shown a circuit by which correction is made for time lag of the pulses through the pulse distributing cascade. Shown are two cascade multivibrators or flip-flops 270 and 271. Flip-flop 270 has external pulse output 272, pulse input 273, another pulse output 274, and a D.C. output 275. Flip-flop 271 has an external pulse output 276, a pulse output 278, a pulse input 277, and a D.C. output 280. Also shown is a transistor 281 having a base 282, an emitter 283, and a collector 284. Another transistor 285 has a base 286, an emitter 287 and a collector 290. There is shown still another transistor 291, which has a base 292, an emitter 293, and a collector 294. The circuit also has a pulse transformer 295 which has an input winding 296 and an output winding 297. Output winding 297 has one end connected to ground 151 and has the other end connected through a capacitor 300 to a gated pulse output terminal 301. Input winding 296 has one end directly connected to collector 294 and its other end connected directly to power input terminal 298 and connected through resistor 302 to emitter 287. The base 292 of transistor 291 is connected directly to the collector 290 of transistor 285. Emitter 293 is connected directly to ground 151, and emitter 287 is connected through a capacitor 303 to a clock pulse input terminal 304. The base 286 of transistor 285 is connected to the emitter 283 of transistor 281 through the parallel combination of a resistor 305 and a capacitor 306. Emitter 283 is also connected through a resistor 307 to ground 151. Collector 284 of transistor 281 is directly connected to a power input terminal 310; collector 284 is also connected through resistor 211 to base 282. The pulse output 274 of flip-flop 270 is connected to pulse input 277 of flip-flop 271. The D.C. output 275 of flip-flop 270 is connected to base 282 of transistor 281 through a series combination of a resistor 312 and a diode 313. The series combination of a resistor 314 and a diode 315 connects D.C. output 280 of flip-flop 270 to base 282 of transistor 281. The broken line rectangle 316 encloses that portion of the circuit which is a pulse gate.

*Operation of FIGURE 1*

Referring now to FIGURE 1, it will be noted that provision is made for a four-order binary number input. That is, of course, exemplary only, for the circuit can be changed as desired to accommodate a binary number input having any number or orders. The digit signal inputs 1, 2, 3, and 4 are connected respectively to the "and" gates 7, 12, 15 and 18 through the conductors 5, 10, 13, and 16 so that the "and" gates are enabled upon application of the proper signals at the binary number input terminals 1, 2, 3 and 4. Looking specifically at gate 7, for example, when an enabling signal is applied to input terminal 6 gate 7 is so enabled that any pulses appearing at the other input 54 of the same gate 7 are transmitted to output 23 of gate 7. These "and" gates are so called to indicate that they present an output only when both one input *and* the other input are present. Each of the "and" gates shown in FIGURE 1 operates in the same fashion, that is, an output is presented only upon application of suitable signals to both inputs.

The operation of the "or" gates identified by numerals 20, 21, and 22, is even simpler. The "or" gates transmit any suitable signal that appears at either input. "Or" gate 20, for instance, presents a signal at output 31 upon application of a suitable signal at either input 25 *or* input 30. It is apparent, then, that signals at the outputs 23, 26, 34, and 41 of "and" gates 7, 12, 15 and 18 appear on conductor 45, which is connected to output 44 of "or" gate 22. While the "or" gates are necessary to the logic of the diagram and are therefore shown for the sake of completeness, they may, in some cases, consist of only a conductor in the actual circuit; the requirement depends upon the nature of the output circuits of "and" gates 7, 12, 15 and 18. Unidirectional "or" gates may be required to prevent undesirable interaction among the output circuits of these "and" gates. In any case, the logic of the invention remains; actual circuitry will be discussed later in this specification. With this much established, attention will now be directed to the production of the other inputs to "and" gates 7, 12, 15 and 18, that is, the signals at inputs 54, 61, 67 and 75.

It will be noted that an output 57 of flip-flop 50 is connected to input 60 of flip-flop 51 through conductor 58, that output 64 of flip-flop 51 is connected to input 66 of flip-flop 52 through conductor 65, and that output 72 of flip-flop 52 is connected to input 74 of flip-flop 53 through conductor 73. Flip-flops 50, 51, 52 and 53 are thus connected in cascade. The input 79 of the first flip-flop in this cascade, flip-flop 50, has applied to it through conductor 88, pulses appearing at output 105 of flip-flop 78. The input 106 of flip-flop 78 is connected to clock pulse input terminal 81 through conductor 80. Now, all of the flip-flops shown in FIGURE 1 are essentially bistable devices. In addition, flip-flops 78, 50, 51, 52, and 53 contain output circuits, as will be explained in more detail in another part of this specification, which produce pulses of short duration at the particular outputs rather than direct current voltage levels. This feature, along with the bistable nature of the device operates to produce pulses alternately at one and then the other output in response to successive input pulses. Specifically, then, a first pulse and each subsequent alternate pulse appearing at input 79 of flip-flop 50 cause a pulse to appear at output 56, and a second pulse and each subsequent alternate pulse appearing at input 79 of flip-flop 50 cause a pulse to appear at output 57. This can be thought of as a pulse distributing action or a frequency dividing action, for each output of flip-flop 50 has an output pulse frequency or pulse repetition rate equal to one-half that of the input 79. It is important to note further that the pulses appearing at outputs 56 and 57 do not coincide with one another. When a positive pulse appears at output 56, none appears at output 57, and vice-versa. Each of the flip-flops 78, 50, 51, 52, and 53 operate in the same fashion; flip-flops 53 and 78, however, each have only one output shown.

It is now evident that, for a given even number of pulses applied at input 79, one-half that number of pulses appear at output 56 of flip-flop 50 and that the remainder also equal to one-half the number of input pulses, appear at output 57. In turn, since output 57 is connected to input 60 of flip-flop 51, the number of pulses appearing at output 63 of flip-flop 51 is one-half the number of pulses appearing at output 57 of flip-flop 50. In a similar manner, the number of pulses at 71 of flip-flop 52 is one-half the number of those appearing at output 64 of flip-flop 51, and the number of pulses appearing at output 77 of flip-flop 53 is one-half the number of those appearing at output 72 of flip-flop 52. The outputs 56, 63, 71 and 77 may be called the external outputs of the cascade made up of flip-flops 50, 51, 52, and 53. Using this nomenclature, then, it can be said that the external output from the first flip-flop in the cascade has twice as many output pulses for a given time as does the external output of the next flip-flop in the cascade, and so on through the cascade; or, from the other point of view, that each external output has one-half number of pulses per given time as does the previous external output from said cascade.

The operation of the cascade of flip-flops may be understood even more readily by reference to FIGURE 2. In FIGURE 2 the pulses 120 represent the input to the first flip-flop in the cascade, flip-flop 50. Output pulses appearing at output 56 of flip-flop 50 are represented by pulses 121. It is seen that a pulse appears in group 121 for every other pulse appearing in group 120. The pulses of group 120 not appearing in group 121, of course, are those that are transmitted to the next flip-flop 51 in the cascade. Of those pulses transmitted to input 60 of flip-flop 51, every other pulse causes an output pulse at output 63 of flip-flop 51. The latter output pulses are depicted as group 122 of FIGURE 2. Further, those pulses appearing at input 60 that do not cause pulses at output 63 do cause pulses to appear at output 64 of flip-flop 51, and it is these latter pulses that are transmitted to the input 66 of the next flip-flop 52 in the cascade. As before, one-half of these pulses, at input 66, give rise to pulses at output 71 of flip-flop 52, and the other half of the pulses at input 66 cause pulses to be transmitted to the input 74 of the next flip-flop 53. Output 71, therefore, presents a pattern represented by group 123 of FIGURE 2, and the output 77 of flip-flop 53 is shown as group 124 of FIGURE 2. It is easily seen, then, that a cascade of flip-flops of this sort, having external outputs as described, does act as a pulse distributing or frequency dividing system in which the pulses appearing at the external outputs are each unique in time and have pulse frequencies or repetition rates equal to one-half that of the previous output and twice that of the following output.

Returning to the operation of the converter shown in

FIGURE 1, it is again noted that each of the "and" gates 7, 12, 15, and 18 is connected uniquely to one binary number input terminal. Thus, gate 18 is enabled, that is, passes the input pulses appearing at input 75 to its output 41, when a signal representing a 1 is applied to terminal 4. On the other hand, when the signal applied to terminal 4 represents a 0, "and" gate 18 is disabled, that is, has no output. The same function is true of terminals 1, 2, and 3 as regards gates 7, 12, and 15. Each signal controls an associated "and" gate. In addition, the output of the flip-flop presenting pulses having the highest repetition rate, output 56 of flip-flop 50, is connected to the "and" gate controlled by signals representing the highest order digit of the binary number input, input 54 of gate 7. Each pulse output presenting pulses of a lower repetition rate is likewise connected to an "and" gate associated with a correspondingly lower order digit of the binary number input. Thus, output 63 of flip-flop 51 is connected to input 61 of gate 12 through conductor 62, output 71 of flip-flop 52 is connected to input 67 of gate 15 by conductor 70 and output 77 of flip-flop 53 is connected to input 75 of gate 18 by conductor 76.

At this point, an example will probably best show the method of conversion. Suppose that signals representing the binary number 1010 are applied at the binary number input terminals 1, 2, 3, and 4. Gates 7 and 15 are then enabled, allowing the pulses at outputs 56 and 71 of flip-flops 50 and 52, respectively, to appear on conductor 45, as explained before. Now, for every 16 pulses appearing on input 79, which is the input to the cascade of frequency dividing multivibrators, eight pulses appear at output 56, four pulses appear at output 63, two pulses appear at output 71, and 1 pulse appears at output 77. Out of every sixteen input pulses to the cascade, then, representing 1010, eight plus two, or ten, pulses appear on conductor 45. Thus, the binary number 1010, which is the binary equivalent of the decimal number 10, is now represented by ten pulses on conductor 45, for every sixteen input pulses.

Taking as another example the binary number 1111, which in decimal terms is 15, it is seen that all of the "and" gates 7, 12, 15, and 18 will be enabled. Therefore, for each sixteen input pulses to the cascade input 79, gate 7 transmits 8 pulses, gate 12 passes four pulses, gate 15 passes two pulses, and gate 18 passes one pulse, the total of which appears on conductor 45 and is equal to fifteen pulses. With a four-order input, the numbers that can be converted range from 0 through 15. For a greater range it is necessary to increase the number of orders in the input. This can be accomplished simply by changing the number of flip-flops and associated circuitry in the cascade to equal the number of orders in the binary number input.

So far, then, the converter has produced a pulse output the average repetition rate of which is proportional to the value of the binary number input. For some applications this may be a sufficient conversion; for other applications, however, it may be desirable to obtain an output of which the average value, or average magnitude, is propotrional to the value of the binary number input.

To perform this latter function, that of producing pulses having an average value, rather than just an average repetition rate proportional to the value of the binary number input, the pulse output appearing on conductor 45 is connected to another portion of the diagram of FIGURE 1. Before considering the operation portion of FIGURE 1 in detail, only the results of its operation will be considered to make more readily understandable the operation of the entire converter. The latter portion of the diagram of FIGURE 1 referred to, comprising flip-flops 90 and 91 and "and" gates 82 and 83, along with the associated circuitry, operates, when triggered or set by a pulse on conductor 45, to provide an output pulse having a width equal to the duration between the next two clock pulses. The pulse thus produced appears at terminal 99. It is evident, then, that the width of pulses at terminal 99 is controlled only by the clock pulse input, and is not dependent upon the shape of the pulses appearing on conductor 45. This is highly desirable, for the average of the "on" time, the time when the pulse is present, of the output at terminal 99 is then the same regardless of the repetition rate of the clock pulses. When the clock pulse repetition rate halved, for instance, the "on" time of each output pulse at terminal 99 also is halved—so is the time between these output pulses, however, so that the average "on" time remains the same. The stability of the clock pulse input with this system is, therefore, much less important than it is with other converter systems using standard pulse sources.

To explain the operation of this latter portion of the converter, which portion may be referred to as a precision gating system, reference is made again to FIGURE 1. It will be noted that flip-flops 90 and 91 differ from the other flip-flops in FIGURE 1 in that they each have two inputs. Another difference is that flip-flops 90 and 91 have outputs which, rather than producing pulse outputs, simply shift from one D.C. level to another D.C. level in accordance with whichever of the bistable conditions prevails at the time. As shown, then, the operation is as follows. When a pulse appears on conductor 45, which is connected to input 100 of flip-flop 91, flip-flop 91 is triggered to a first stable condition which produces a on output 111 that prevails until flip-flop 91 is triggered to its second stable condition. Output 111 is connected by conductor 112 to input 110 of "and" gate 83, and gate 83 is enabled by the signal of the first stable condition. Since "and" gate 83 is now enabled, the next clock pulse appearing at input 86 causes an output pulse to appear at output 108 of gate 83. The appearance of this pulse at output 108 has two consequences; it is presented to input 113 of gate 91 through conductor 114 and so triggers flip-flop 91 to its other stable condition and thus disables gate 83, and also is presented at input 92 of flip-flop 90 through conductor 115 and 116 and triggers flip-flop 90 to the condition whereby gate 82 is enabled. This is due to the controlling action of output 94 upon "and" gate 82, which has input 96 connected through conductor 97 to output 94 of flip-flop 90. It will be noted that output 94 of flip-flop 90 is also connected to precision pulse output 99 by conductor 98. The output 107 of gate 82 being connected through conductor 101 to input 93 of flip-flop 90, it is seen that the next clock pulse now is transmitted through the enabled gate 82 and triggers flip-flop 90 to its other stable condition, whereupon gate 82 is again disabled and output 94 of flip-flop 90 is returned to its former stable condition. It is now clear that output 94 presents pulses equal in width to the time between two consecutive clock pulses as a consequence of the appearance of pulses appearing on conductor 45.

To further clarify the operation of producing precision output pulses, reference is now made to FIGURE 3. The pulses identified by numeral 129 represent the clock pulse input applied at terminal 81 of FIGURE 1; pulses 130 represent pulses appearing on conductor 45 and input 100 of flip-flop 91. It is seen that output 111 of flip-flop 91, which is identified in FIGURE 3 by numeral 131, is triggered "on" by each of pulses 130, and that it is thereafter triggered to the "off" condition by the next clock pulse, for this next clock pulse is transmitted through gate 83, now in the "on" condition. Numeral 132 designates the output 108 of gate 83, and it is clear that whenever gate 83 is enabled, the next clock pulse is transmitted through it, appears at output 108, and, as before, triggers flip-flop 91 "off" and flip-flop 90 "on." Pulses 133 represent the output 94 of flip-flop 90, and pulses 134 represent the output 107 of gate 82. It is seen, then that output 94 is triggered "on" by each pulse transmitted through gate 83 and is triggered "off" by each clock pulse transmitted through gate 82. Flip-flop 90 then is turned on by one clock pulse and is turned off by the next clock pulse. This is shown clearly in FIGURE 3 where each pulse 132 turns on output 94 represented in FIGURE 3 by numeral 133, and the next clock pulse thereupon appears at output 107, represented in FIGURE 3 by numeral 134, and shuts off output 94. The appearance of pulses 132, of course, is dependent upon the condition of gate 83, which in turn depends upon the appearance of pulses at input 100 of flip-flop 91. Note the delay of pulses 130 with respect to pulses 129. This is shown to point out that some delay of the pulses at input 100 may occur due to the flip-flops and gates of the previous pulse distributing and weighting circuitry, but that this delay is of no consequence so far as the width of the precision output pulses at terminal 99 is concerned.

The output 95 of flip-flop is shown in FIGURE 3 and identified by numeral 135. This output is simply the opposite of output 99, and is shown for the sake of completeness. It may or may not be required or useful, depending upon the nature of apparatus connected to the converter.

The slight delay in the pulses appearing on conductor 45 with relation to the clock pulses brings into view the function of flip-flop 78 in the diagram of FIGURE 1. Since the appearance of a pulse on conductor 45 actuates the precision pulse forming circuitry to operate between the next two clock pulses, it is obvious that the maximum repetition rate of pulses on conductor 45 must not be greater than one-half the repetition rate of the clock pulses. Proper operation requires that, after appearance of one pulse on conductor 45, the next pulse on conductor 45 does not appear until after the second subsequent clock pulse. Flip-flop 78 acts as a pulse frequency divider operating to a scale of two and presents to input 79 of the pulse distributing cascade pulses having a repetition rate equal to one-half that of the clock pulse input, and therefore satisfies the requirements for proper operation. This assumes, of course, that a pulse appearing on conductor 45 is delayed no more than the time between two clock pulses. If the delay is more than this amount in a particular arrangement, proper operation is still insured by further division of a clock pulse input. For example, flip-flop 78 could be replaced by two flip-flops in cascade, so that the pulses at 79 of the pulse distributing cascade would then have a pulse repetition rate equal to one-fourth that of the clock pulse input, the maximum tolerable delay of pulses on conductor 45 thus being further increased. A more satisfactory method of correcting for excessive delay is explained later.

It is seen that in the precision gating system the width of the output pulses appearing on terminal 99 is determined by the time between the clock pulses, which are applied simultaneously to gates 82 and 83. It is clear then, that the precision pulse width may be varied by placing a frequency dividing device between the clock pulse input 81 and "and" gates 82 and 83, rather than feeding the gates 82 and 83 directly from the clock pulse input. Thus, when the pulse inputs to "and" gates 82 and 83 are of one-half the rate of the clock pulse input, the pulses appearing at output terminal 99 are twice the previous width. But the restriction that the repetition rate of pulses applied at input 100 of flip-flop 91 be no more than one-half the repetition rate of the input of the pulse input to terminals 85 and 86, of course, is then violated. Therefore, further frequency division is required between the clock pulse input and input 79 of the cascade. It is desirable then, to have variable, or switchable, pulse frequency dividing devices both between the clock pulse input and the cascade input 79 and between the clock pulse input and the precision gating system "and" gates 85 and 86 so as to control both the width of, and the spacing between, the precision output pulses at terminal 99.

FIGURE 1 shows, then, a schematic diagram of a device which produces at its outputs 99 and 102 pulse trains, the average values of which are directly and inversely proportional, respectively, to the value of a binary number input. For many applications this may be a sufficient conversion. Should a particular application, however, require a D.C. indication, either or both of the outputs need simply to be integrated or averaged to produce the desired result. In the latter connection, it will be noted that the output of this device is particularly well adapted for accurate averaging or smoothing. Not only are the pulses extremely precise, but the pattern of the pulse output for any combination of digits in the binary number input has a substantially uniform pulse distribution. This can be seen by combining the outputs of the cascade flip-flops associated with the several digits, shown in FIGURE 2. The even pulse distribution prevents difficulties in integrating or averaging the output that might otherwise occur.

Continuing now, attention is directed to the actual circuitry of some of the components shown in block form. Reference is made first to FIGURE 4, which shows the circuit of a toggle-type or single input type, bistable multivibrator or flip-flop. Supply voltage for this circuit is applied between terminal 152 and ground 151, terminal 152 being of negative polarity when PNP transistors are used in the circuit as shown. Applied to terminal 153 is a bias voltage positive with respect to ground 151. The circuit is a straight-forward multivibrator circuit, with the following additional features: diodes 156 and 160 make the circuit responsive only to positive input pulses, and the inclusion of capacitors 171 and 175 makes it possible for the circuit not only to produce D.C. output signals at terminals 170 and 174, but also pulse output signals at terminals 173 and 167. To see how the circuit works, consider that transistor 140 is conducting and that transistor 144 is nonconducting. The voltage at terminal 170, then, is negative, and the voltage at terminal 174 is substantially zero, that is, at ground level. When a positive input pulse is applied to terminal 162, transistor 140 is triggered to the nonconducting state and transistor 144 switches to the conducting state. This causes the voltage at terminal 174 to become negative and the voltage at terminal 170 to become substantially zero with respect to ground. In addition, the rapid change of voltage at terminals 174 and 170 causes pulses to appear at terminals 173 and 167, due to the differentiating action of capacitors 175 and 171. Thus, a negative pulse appears at terminal 173 and a positive pulse appears at terminal 167 simultaneously with the switching of the transistors. The next positive pulse that appears at terminal 162, of course, causes the transistors to switch back to their former condition, thereby returning the voltages on terminals 174 and 170 to their former values, and thereby causes a positive pulse to appear at terminal 173 and a negative pulse to appear at terminal 167. The term "toggle" then, is quite apt when applied to this circuit, for one may think of positive pulses applied at terminal 162 as being switches alternately to pulse output terminal 173 and pulse output terminal 167.

The circuit shown in FIGURE 5 is that of a two input bistable multivibrator, or flip-flop, which may be used in a system embodying the invention. The transistors 180 and 184 being of the PNP type as shown, a negative supply voltage is applied at terminal 191. In addition, a positive bias voltage is applied at terminal 192. Since the circuit is quite conventional, its operation will be discussed only briefly. The circuit is so arranged that when transistor 180 is in a conducting condition, transistor 184 is in a nonconducting condition, and vice versa. Therefore, when D.C. output terminal 195 is essentially at ground potential, D.C. output terminal 197 has a negative potential, essentially that of the negative supply voltage applied at terminal 191. And, of course, when transistor 184 is in a conducting condition, terminal 197 is essentially at ground potential and terminal 195 is at a negative potential approximately equal to that applied to terminal 191. It will be noted that diodes 207 and 210 are so poled that only positive pulses appearing on trigger input terminals 205 and 206 are transmitted through these diodes. It can be seen, further, that in order to be effective in switching the circuit, that is, in causing the transistor 180 and 184 to interchange their conductive conditions, the positive pulse must be applied to the correct one of terminals 205 and 206, depending upon which of the transistors is conducting at that instant. For example, when transistor 180 is conducting and transistor 184 is not conducting, a positive pulse applied at terminal 206 has no effect on the circuit, because it can simply make base 185 more positive—and since transistor 184 is already nonconducting, nothing further happens. However, with the circuit in the same condition, the application of the positive pulse to terminal 205 causes base 181 to become more positive and tends to lower the conduction of transistor 180. The circuit is thus triggered to its other condition, in which transistor 180 is nonconductive and transistor 184 is conductive. In this latter condition, it can be seen that a positive pulse is effective only when it is applied to terminal 206. Flip-flops of the type shown in FIGURE 5 are the type represented by flip-flops 90 and 91, FIGURE 1.

FIGURE 6 shows the circuit of an "and" gate, or controlled pulse gate, that operates somewhat as a switch. The input pulses, those pulses that are to be gated, are applied at terminal 221. The gated output pulses, those pulses that have been allowed through the gate, appear at terminal 223. The signals that control the gate are applied at terminal 220. The circuit is basically an emitter-follower with a switch in series with the emitter resistor. This switch takes the form of a transistor 228, which is controlled to the conducting and nonconducting conditions by application of the proper signal at terminal 220. It can be seen that when a negative signal is applied to terminal 220, and consequently to base 229 through resistor 232, emitter current flows and, when base 229 is biased enough, the effective impedance from emitter 230 to collector 231 of transistor 228 is very low. On the other hand, when no voltage, or a positive voltage is applied, to terminal 220 the action is just the opposite—that is, no emitter current can flow, and consequently the impedance from emitter 230 to collector 231 is very high. Now, with transistor 228 in the high impedance, or off condition, resistor 233, the emitter follower resistor is effectively disconnected. No current can go through resistor 233, and therefore no voltage can be developed across it. As a result, pulses appearing at terminal 221 cannot be transmitted to gate pulse output terminal 223. However, with transistor 228 in the low impedance, or the on condition, the remainder of the circuit acts as an emitter follower, and pulses appearing at terminal 221 are transmitted to terminal 223. This circuit, therefore, fulfills the requirements of the "and" gates used in the converter.

FIGURE 7 shows typical "or" gates that may be used in the converter. It is obvious that positive pulses appearing on either terminal 257 or 260 are transmitted through the diodes 255 or 256 to output terminal 258. There is no additional control on the transmission of the pulses, and it is easily seen that every positive pulse is transmitted from the inputs of the gate to the output. The gate including diodes 261, 262, 263, and 264 operates in exactly the same fashion, but simply has two extra inputs and diodes. It is obvious that any number of diodes may be connected in a similar fashion to give an "or" gate of any desired number of inputs.

FIGURE 8 shows a circuit that may be used to correct for the delay of pulses in the flip-flop cascade. When the cascade, for example, is made up of a large number of flip-flops, the delay through the cascade is, at some point, too great for proper operation of the converter. The flip-flops 270 and 271 shown in FIGURE 8 are of the type shown in FIGURE 4 and explained above and have both pulse outputs and D.C. outputs. As will be recalled, they operate so that flip-flop 270 in FIGURE 8, then, presents a negative voltage at D.C. output terminal 275 after a positive pulse has appeared on terminal 272, and D.C. output terminal 275 is approximately at ground potential after a positive pulse has been produced at pulse output terminal 274. Likewise, D.C. output 280 of flip-flop 271 is negative after the appearance of a positive pulse at pulse output 276 and is approximately at ground potential after the appearance of a positive pulse at pulse output terminal 278. Output 278 is not used in the circuit of FIGURE 8, but is shown merely for ease of explanation. It is to be understood that FIGURE 8 shows only a part of a flip-flop cascade, or pulse distributing cascade.

Suppose now that the pulses transmitted through the cascade are so delayed by the time they arrive at flip-flop 271 that further transmission causes incorrect operation of the converter. Instead of transmitting the pulse from output 278 to the input of the next flip-flop in the cascade, the gate 316 and other circuitry of FIGURE 8 is so arranged that, when pulse output 278 presents a pulse in response to a clock pulse at the input of the cascade, that clock pulse is transmitted to the next flip-flop input rather than the delayed pulse from pulse output 278. To accomplish this, the clock pulses are not only applied at the input of the cascade but also at terminal 304 of gate 316. The gate is then enabled at the proper time to transmit a clock pulse to output terminal 301 of gate 316 whenever the same clock pulse would produce a pulse at output 278 of flip-flop 271. Terminal 301, of course, is connected to the input of the next flip-flop in the cascade. By this means, then, the delay has been corrected, for the pulse at output 301 would occure were there no delay in the previous flip-flops, the ideal condition.

It will be noted that the gate 316 must be enabled only at the proper time and must be disabled at all other times so that output 301 does not present pulses except when flip-flop 271 should normally present pulses at output 278. To show clearly when gate 316 is to transmit a clock pulse, reference is now made to FIGURE 1, with special attention directed towards the cascade of flip-flops 50, 51, 52 and 53. The pulses appearing at the input 79 of the cascade will be here spoken of as clock pulses. It is well, further, to define the two conditions of each flip-flop; let the condition of each flip-flop when it has produced an external positive output pulse and before it produces a positive pulse at its other output be known as its first condition and the remainder of the time be known as the second condition. Specifically, for instance, when flip-flop 50 has produced a positive pulse output at output 56 and before it produces the next positive pulse at output 57 it is in condition one; and during the time between the production of a positive pulse at output 57 and the next pulse at output 56, it is in condition two. It is now noted that when flip-flop 50 is in condition one the next pulse at input 79 causes a pulse to be produced at output 57. It is also noted that when both flip-flops 50 and 51 are in condition one, the next input pulse at input 79 causes a pulse to be transmitted from output 57 to input 60 and from output 64 to input 66. It is further noted that when flip-flops 50, 51 and 52 are in condition one, the next input pulse at input 79 causes output pulses to appear at all three outputs 57, 64, and 72. It is evident that when all the previous flip-flops in the cascade are in condition one the next clock input pulse to the cascade causes a flip-flop to transmit a pulse to the next flip-flop in the cascade. This being so, the proper condition required for transmission of a clock pulse from terminal 304 to terminal 301 of FIGURE 8 is now established. It is desired that when flip-flop 271 and all the flip-flops previous to it in the cascade are in, condition one that gate 316 be enabled, thereby allowing the next clock pulse to be transmitted through it to the input of the next flip-flop in the cascade. The problem now is simply one of enabling gate 316 when the previous flip-flops are in condition one.

The actual operation of gate 316 of FIGURE 8 is as follows. Recalling again that gate 316 should be enabled only when flip-flops 271 and those previous to it in the cascade are in the first condition, described above, it will be recalled (from reference to the circuit of FIGURE 4) that the D.C. outputs shown at 280 and 275 and the analogous outputs of the previous flip-flops present a negative voltage whenever these flip-flops are in the first condition. Now diodes 313 and 315 are connected from terminals 275 and 380 through resistors to base 282 in such a direction that when terminals 275 and 280 are negative no current flows through the diodes. Base 282 is then effectively disconnected electrically from terminals 275 and 280 and assumes a voltage approximately equal to that on terminal 310—terminal 310 is a negative supply voltage and therefore base 282 becomes negative. This causes current to flow from emitter 283 to base 282 and a voltage drop appears across resistor 307 causing emitter 283 to become negative with respect to ground. Since the parallel combination of resistor 305 and capacitor 306 connects emitter 283 to base 286, base 286 is also made more negative. Since power input terminal 298 is connected to a negative voltage source, transistor 291 is normally conducting.

In addition, emitter 287 of transistor 285 is normally at a negative potential, for it is connected to terminal 298 through resistor 302. With base 286 now at a negative potential, a positive pulse applied at terminal 304 makes emitter 287 more positive than base 286, causing current to flow during the pulse from emitter 287 to collector 290 and to base 292. Base 292 of transistor 291 becomes more positive during the pulse, and reduces the current normally flowing from emitter 293 to collector 294 of transistor 291 and through input winding 296 of transformer 295. This very brief reduction in the current flowing through winding 296 causes a pulse to appear across output winding 297 and, at gated pulse output terminal 301 which is connected to winding 297 by capacitor 300. Thus, a pulse is transmited to the next flip-flop in the cascade when the previous flip-flops are in condition one. Now, when any of the previous flip-flops are in condition two, for example, flip-flop 270, its D.C. output, terminal 275 in this case, is at approximately ground potential. Current then flows through the accompanying resistor 312 and diode 313 to base 282 of transistor 281, and the base 282 then approaches ground potential. Transistor 281 being connected as an emitter follower, emitter 283 also approaches ground potential, as does base 286 of transistor 285. With base 285 at approximately ground potential and emitter 287 at a negative potential, a positive pulse applied at terminal 304 of smaller magnitude than the potential difference from base 285 to emitter 287 has no effect on the conductivity of transistor 285, and so is not transmitted to gated pulse output 301.

It is therefore established that output 301 presents a pulse with no delay whenever it is needed according to the logic of the cascade. It is to be pointed out again that a resistor and diode series combination such as 312 and 313 or 314 and 315 is connected from the proper D.C. output, as explained, of each of the previous flip-flops to the base of the transistor represented by transistor 281. The diodes then, represent a multi-input "or" gate connected so that the following pulse gate will be disabled whenever any of the cascade flip-flops are in the second condition.

In a successful embodiment of the invention, flip-flops of the type shown in FIGURE 4 were used as cascade flip-flops such as flip-flops 50, 51, 52 and 53 of FIGURE 1, with the addition of the pulse delay correction scheme as shown in FIGURE 8. The total number of flip-flops in the cascade of this successful embodiment was 20, and the pulse delay correction scheme was used after groups of four flip-flops in the cascade. The "and" gates were of the type shown in FIGURE 6, and the "or" gates were of the type shown in FIGURE 7. The flip-flops of the precision pulse circuitry as represented by flip-flops 90 and 91 of FIGURE 1 were of the type shown in FIGURE 5. The values of the circuit components in this successful embodiment were as follows:

FIGURE 4

| | |
|---|---|
| Resistors **154** and **155** | 1000 ohms. |
| Capacitors **171** and **175** | 500 mmf. |
| Resistors **164** and **166** | 10,000 ohms. |
| Capacitors **163** and **165** | 500 mmf. |
| Transistors **140** and **144** | 2.76 |
| Diodes **156** and **160** | CK747 |
| Resistor **161** | 68,000 ohms. |
| Voltage at terminal **152** | —6 volts. |
| Voltage at terminal **153** | +3 volts. |

FIGURE 5

| | |
|---|---|
| Resistors **211** and **212** | 68K ohms. |
| Diodes **207** and **210** | 1N305 Raytheon. |
| Transistors **180** and **184** | 2N136 GE. |
| Resistors **193** and **194** | 680 ohms. |
| Resistors **201** and **203** | 15K ohms. |
| Capacitors **202** and **204** | 200 mmf. |
| Voltage at terminal **191** | —6 volts. |
| Voltage at terminal **192** | +3 volts. |

FIGURE 6

| | |
|---|---|
| Transistors **224** and **228** | 2N76 GE. |
| Resistor **232** | 10K ohms. |
| Resistor **233** | 3300 ohms. |
| Resistor **234** | 3300 ohms. |
| Capacitor **235** | 500 mmf. |
| Voltage applied at terminal **222** | —6 volts. |

FIGURE 7

| | |
|---|---|
| Diodes in "or" gate | 1N305 Raytheon. |

FIGURE 8

| | |
|---|---|
| Transistors **281** and **285** | 2N76 GE. |
| Resistor **302** | 6800 ohms. |
| Capactors **300** and **303** | .001 mfd. |
| Transformer **295** | Sprague 5–1 Y66356. |
| Resistor **305** | 10K ohms. |
| Resistor **307** | 4700 ohms. |
| Resistor **311** | 10K ohms. |
| Transistor **281** | 2N76. |
| Diodes **313** and **315** | CK747. |
| Resistors **312** and **314** | 4700 ohms. |

Many changes and modifications of this invention will undoubtedly occur to those who are skilled in the art and I therefore wish to be understood that I intend to be limited by the scope of the appended claims and not by this specific embodiment of my invention which is disclosed herein for the purpose of illustration only.

I claim:

1. An electric converter for producing a pulse train output having a pulse rate proportional to the value of a binary number input comprising: a source of pulses having first and second outputs, said first and second output presenting constant pulse width pulses, the pulses presented by said first output having twice the repetition rate of, and being spaced between, the pulses presented by said second output; first and second gate means each having a pulse input, a pulse output and a control input; means connecting the first output of said source of pulses to the pulse input of said first gate means; means connecting the second output of said source of pulses to the pulse input of said second gate means; means connecting the pulse outputs of said first and second gate means to a common output terminal; and means adapted to respectively connect the control inputs of said first and second gate means to suitable sources of first and second signals representative of first and second digits of respectively lesser order in a binary number, whereby the pulse rate of pulses appearing at said common output terminal is proportional to the value of the binary number.

2. An electric converter for producing a pulse train output having a pulse rate proportional to the value of a binary number input comprising: first and second gate means each having an input and an output, said first gate means adapted to be enabled by the highest order digit of a binary number and said second gate means adapted to be enabled by a respectively lesser order digit of the binary number; first and second multivibrators each having input terminals and first and second output terminals, said multivibrators being characterized so as to produce substantially constant time duration pulses at said output terminals; means connecting the first outputs of said first and second multivibrators to the input of said first and second gate means respectively; means connecting the second output terminal of said first multivibrator to the input terminal of said second multivibrator; a source of clock pulses; means connecting said source of clock pulses to the input terminal of said first multivibrator; and means connecting the output of said first and second gate means to a common converter output, whereby the pulse rate of pulses appearing at said common converter output is proportional to the value of the binary number.

3. A converter for producing a pulse train output having a pulse rate proportional to the value of a binary number input comprising: a plurality of gate means, each having an input and an output, the first of said plurality of gate means adapted to be enabled by the highest order digit of a binary number and each succeeding gate means of said plurality adapted to be enabled by a respectively lesser order digit of the binary number; a pulse source having a plurality of outputs, said plurality of outputs presenting substanially constant pulse width pulses, the second of said plurality of outputs presenting pulses having one-half the repetition rate of, and spaced between, pulses presented by the first of said plurality of outputs, and each of the following outputs of said plurality of outputs presenting pulses having one-half the repetition of, and spaced between, pulses presented by the immediately preceding output; means respectively connecting the first of said plurality of outputs of said pulse source to the input of said first gate means, and each succeeding output of said plurality of outputs to the input of each succeeding gate means of said plurality of gate means; and means connecting the outputs of said plurality of gate means to a common converter output, whereby the pulse rate of pulses appearing at said common converter output is proportional to the value of the binary number.

4. An electric converter for producing a pulse train output having a pulse rate proportional to the value of a binary number input comprising: first and second gate means each having an input and an output, said first gate means adapted to be enabled by the highest order digit of a binary number and said second gate means adapted to be enabled by a respectively lesser order digit of the binary number; a source of pulses having first and second pulse outputs, said first and second pulse outputs presenting substanitally constant pulse width pulses, the pulses presented by said first pulse output having twice the repetition rate of, and being spaced between, the pulses presented by said second pulse output; means connecting said first pulse output to the input of said first gate means; means connecting said second pulse output to the input of said second gate means; signal translation means having an input and an output; means connecting the input of said signal translation means to the outputs of said first and second gate means; switching means having first and second inputs and a precision pulse output, said switching means being operable by an electric signal applied to the first input of said switching means to present a pulse at said precision pulse output of duration corresponding to the time between two subsequent electric signals applied to the second input of said switching means; means connecting the output of said signal translation means to the first input of said switching means; and means adapted to connect the second input of said switching means to a source of clock pulses.

5. A converter for producing a pulse train output having a pulse rate proportional to the value of a binary number input comprising: a plurality of gate means each having an input and an output, the first of said plurality of gate means adapted to be enabled by the highest order digit of a binary number and each succeeding gate means of said plurality adapted to be enabled by a respectively lesser order digit of the binary number; a cascade of bistable multivibrators corresponding in number to the number of said plurality of gate means, said cascade having an external pulse output from each of said multivibrators and having an input to the first multivibrator in said cascade, so that, upon application of electric pulses to said input to said first multivibrator, the external output of said first mulivibrator in said cascade presents substantially constant pulse width pulses having one-half the repetition rate of the pulse applied at the input to said first multivibrator and each of the following external outputs in said cascade presents substantially constant pulse width pulses having one-half the repetition rate of the output pulses of the immediately preceding multivibrator in said cascade; means severally connecting the external pulse outputs of said cascade to the inputs of said gate means so that the external pulse output having the highest repetition rate is connected to the gate means associated with the highest order digit of the binary number, and each external pulse output presenting pulses of a lower repetition rate is connected to the gate means associated with the digit of correspondingly lower order in the binary number; and means connecting the outputs of said plurality of gate means to a common output, whereby the pulse rate of pulses appearing at said common output is proportional to the value of the binary number.

References Cited in the file of this patent

UNITED STATES PATENTS

| | | |
|---|---|---|
| 2,647,208 | Dejager | July 28, 1953 |
| 2,718,634 | Hansen | Sept. 20, 1955 |
| 2,731,631 | Spaulding | Jan. 17, 1956 |
| 2,736,889 | Kaiser | Feb. 28, 1956 |
| 2,802,940 | Burton | Aug. 13, 1957 |
| 2,827,233 | Johnson et al. | Mar. 18, 1958 |
| 2,907,021 | Woods | Sept. 29, 1959 |